(12) United States Patent
Morris (10) Patent No.: US 8,439,115 B2
(45) Date of Patent: *May 14, 2013

(54) METHODS OF CHEMICAL DIVERSION OF SCALE INHIBITORS

(75) Inventor: Liz Morris, Aberdeen (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/738,082

(22) Filed: Apr. 20, 2007

(65) Prior Publication Data

US 2008/0257551 A1    Oct. 23, 2008

(51) Int. Cl.
*E21B 43/22*    (2006.01)
*E21B 43/26*    (2006.01)

(52) U.S. Cl.
USPC ............. 166/305.1; 166/270.1; 166/311

(58) Field of Classification Search .......... None
See application file for complete search history.

(56) References Cited

U.S. PATENT DOCUMENTS

| | | | |
|---|---|---|---|
| 5,018,577 A | 5/1991 | Pardue | |
| 5,038,861 A | 8/1991 | Shuler | |
| 5,092,404 A | 3/1992 | Falk | |
| 5,224,543 A * | 7/1993 | Watkins et al. ............... | 166/279 |
| 5,226,481 A * | 7/1993 | Le et al. ..................... | 166/300 |
| 5,360,065 A | 11/1994 | Falk | |
| 5,409,062 A | 4/1995 | Brown | |
| 5,655,601 A | 8/1997 | Oddo | |
| 5,658,464 A | 8/1997 | Hann | |
| 5,755,972 A | 5/1998 | Hann | |
| 5,797,456 A | 8/1998 | Mokadam | |
| 5,840,658 A | 11/1998 | Rosario | |
| 5,979,557 A | 11/1999 | Card | |
| 6,035,936 A | 3/2000 | Whalen | |
| 6,379,612 B1 | 4/2002 | Reizer | |
| 6,903,054 B2 * | 6/2005 | Fu et al. .................... | 507/244 |
| 6,913,081 B2 | 7/2005 | Powell | |
| 7,268,100 B2 * | 9/2007 | Kippie et al. ............... | 507/131 |
| 2006/0014648 A1 * | 1/2006 | Milson et al. ............... | 507/213 |

FOREIGN PATENT DOCUMENTS

| | | |
|---|---|---|
| WO | 03054350 A1 | 7/2003 |
| WO | WO/03/054350 A1 * | 7/2003 |
| WO | 2006087525 A1 | 8/2006 |
| WO | WO 2008/732333 * | 6/2008 |

* cited by examiner

*Primary Examiner* — Angela M DiTrani (74) *Attorney, Agent, or Firm* — Michael Dae; Daryl R. Wright; Robin Nava

(57) ABSTRACT

A method of treating a hydrocarbon-containing formation including injecting a scale inhibiting well treating fluid into a well, wherein the well treating fluid includes a self-diverting acid that includes about 1% to 20% by volume of at least one viscoelastic surfactant selected from a family of compounds described by

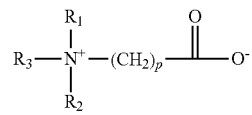

where $R_3$ contains at least 10 carbon atoms, $p=1$-6, $R_2$ contains 1-6 carbon atoms and $R_1$ contains 1-6 carbon atoms; and up to about 20% by weight scale inhibitor.

19 Claims, 2 Drawing Sheets

METHODS OF CHEMICAL DIVERSION OF SCALE INHIBITORS

BACKGROUND OF THE INVENTION

The statements in this section merely provide background information related to the present disclosure and may not constitute prior art.

The invention relates generally to the exploitation of hydrocarbon-containing formations. More specifically, the invention relates to methods and fluids for scale inhibition and/or squeeze treatments that are used to optimize and/or enhance the production of hydrocarbon from a formation.

Hydrocarbons (oil, natural gas, etc.) are typically obtained from a subterranean geologic formation (i.e., a "reservoir") by drilling a well that penetrates the hydrocarbon-bearing formation. In order for hydrocarbons to be "produced," that is, travel from the formation to the wellbore (and ultimately to the surface), there must be a sufficiently unimpeded flowpath from the formation to the wellbore. This flowpath is through the formation rock, e.g., solid carbonates or sandstones having pores of sufficient size, connectivity, and number to provide a conduit for the hydrocarbon to move through the formation.

Recovery of hydrocarbons from a subterranean formation is known as "production." During production, water containing a number of dissolved salts is often coproduced with the hydrocarbon. Especially when the formation is a carbonate, calcium cations are prevalent, as are carbonate and phosphate anions. The combination products of calcium cation with carbonate anion or phosphate anion can precipitate from the water in which the ions are carried to form "scale" deposits when the concentrations of these anions and cations exceed the solubility of the reaction product. The formation of scale in either the wellbore or reservoir or both can slow oil production rate and, in extreme circumstances, stop production completely.

Also, produced water is an inevitable consequence of water injection when water flooding is used to develop an oil reservoir, and scale can slow oil production rate. One typical method of preventing scale deposits forming is to inject or 'squeeze' a scale inhibitor into the reservoir rock where it adsorbs onto the reservoir rock surfaces and helps prevent or diminish scale deposition. The scale inhibitor desorbs in the water phase during oil production until it reaches a certain critical level (minimum inhibitor concentration) when a further squeeze treatment is required.

However, a problem that limits the effectiveness of scale inhibitor treatments is ensuring that the scale inhibitor is delivered to the desired zone. This is particularly a challenge in long, open hole horizontal well bores where heterogeneity in permeability occurs and/or water production is high. It would be difficult for injection of scale inhibitor made in a single stage to reach the far end of a horizontal wellbore penetrating the formation. When there is permeability contrast between zones or a water-producing zone the initially injected scale inhibitor may tend to enter the most permeable layer first leaving other parts of the wellbore untreated. The untreated zones may also be producing water and require protection from the scale inhibitor.

Hence, desired are diversion fluids that can prevent scale forming and be placed over the whole length of the desired zones improving zonal coverage, which generate viscosity and are compatible with scale inhibitors. In addition, what is desired are fluids which decrease in viscosity prior to or during production of the well to prevent the gel blocking the pores of the reservoir rock and lowering oil production. Fluids which provide such advantages are provided, at least in part, by the following invention.

SUMMARY OF INVENTION

The invention, in some aspects, relates to methods and fluids for subterranean formation treatments, such as scale inhibition and/or squeeze treatments that are used to optimize and/or enhance the production of hydrocarbon from a formation. In one aspect, the method is a scale inhibition squeeze treatment method for a hydrocarbon-containing formation, the method including preparing a fluid formed of at least a viscosifier, scale inhibitor, and an aqueous medium, and injecting the fluid into a wellbore and introducing the fluid into a formation.

In another aspect, fluid may be introduced into a formation with permeability contrast between at least two zones, where the fluid penetrates a higher permeability zone, fluid viscosity increases, and scale inhibitor concentration is increased in a zone of lower permeability.

In yet another aspect, fluid is introduced into a water producing zone of a formation, and scale inhibitor is allowed to migrate into at least one zone containing a reduced concentration of water as compared with the water producing zone.

Some embodiments of the invention include introducing a different lower viscosity fluid into the formation to further increase the concentration of scale inhibitor in the zone of lower permeability. Any of the embodiments of the invention may be repeated at least once within an wellsite operation.

Some methods of the invention of the invention incorporate a phosphorus containing molecule for providing scale inhibition fluid properties. One nonlimiting example of such a scale inhibitors is a phosphorus end capped polycarboxylic acid, preferably incorporated into the fluid in an amount from about 0.1% to about 20% by weight. Other exemplary scale inhibitors include phosphate esters, phosphonates, phosphonate polymers, polycarboxylates, phosphorous containing polycarboxylates, phosphate esters of polyols, hydroxylamine phosphate esters, or any combination thereof.

The viscosifier may be viscoelastic surfactant, an example of which being a surfactant selected from a family of compounds described by:

where $R_3$ contains at least 10 carbon atoms, p=1-6, $R_2$ contains 1-6 carbon atoms and $R_1$ contains 1-6 carbon atoms; such as, but not limited to, oleylamidopropyl betaine or erucylamidopropyl betaine. The viscosifier may also be a polymer, such as guar, hydropropyl guar (HPG), carboxymethyl guar (CMG), carboxymethylhydroxypropyl guar (CM-HPG), cellulose, hydroxyethylcellulose (HEC), hydroxypropylcellulose (HPC), carboxymethylhydroxyethylcellulose (CMHEC), xanthan, diutan, scleroglucan, polyacrylamide, polyacrylate, or any mixture thereof.

Also disclosed are methods of providing a scale inhibition treatment using a fluid formed of a viscoelastic surfactant, a phosphorus end capped polycarboxylic acid, and an aqueous medium. Any variety of objects may benefit from treatment with such a fluid, including, but not limited to, piping, wellbore casing, pumps, water heaters, boilers, transportation vehicles, construction materials, structures, transportation infrastructure, and the like.

BRIEF DESCRIPTION OF DRAWINGS

The invention may be understood by reference to the following description taken in conjunction with the accompanying drawings.

DESCRIPTION OF EMBODIMENTS OF THE INVENTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

In one aspect, the invention discloses methods of effective scale inhibitor squeeze treatments. The fluids used according to the method are relatively easy to place, work to prevent scale formation, are compatible with a broad range of additives, and function over a wide range of temperatures. It has been unexpectedly discovered that aqueous fluid treatments containing a surfactant providing viscoelastic fluid properties in combination with a scale inhibitor is effective in diverting the scale inhibitor into areas or zones in a well where it may be most beneficial in adsorbing onto the surface of the formation minerals and prevent deposition of scales that can decrease oil or gas production, and works under a wide range of temperatures. Hence, the invention allows enhanced placement of scale inhibitor in hydrocarbon producing formations to prevent deposits of mineral scales that reduce flow of oil. Also, it has been discovered that the use of these fluids allows placement of scale inhibitors in a single or multiple steps. Squeeze treatment fluids used according to methods the invention generally include viscoelastic surfactant (VES) based viscosifier to provide viscoelastic fluid properties, in combination with a scale inhibitor, in an aqueous medium, but do not include a substantial, and in some cases any, amount of acid for acid treatment purposes (for example viscoelastic diversion acid). However, the fluids may contain an acid or base as necessary to adjust pH as required. Alternatively, the fluids may incorporate a polymer as a opposed to a viscoelastic surfactant as a viscosifier.

Viscoelastic surfactants (VES) are relatively small molecules that will associate under certain conditions to form wormlike micelles (also known as vesicles) in an equilibrium state of breaking and reforming. As dynamic structures, the micellar structures are readily altered by shear pressure, the presence of hydrocarbons, or sometimes by increased temperature. All of these features may be found in the hydrocarbon portion of the reservoir. The wormlike micelles rapidly assume a structure that is not conducive to creating viscosity and/or the surfactant molecules return to their original small independent state once they are placed into the hydrocarbon-bearing zone. Contrarily, the molecules pumped into the water-bearing zones of the formation may advantageously remain behind in wormlike micellar form while in an aqueous environment, and act to block or impede the flow of water from the formation. Well treatment conditions allow wormlike micelles to form under surface conditions and remain stable while they are pumped down the wellbore, but then undergo a structural change or disband into individual components on exposure to hydrocarbons in the reservoir rock.

Figure 1:
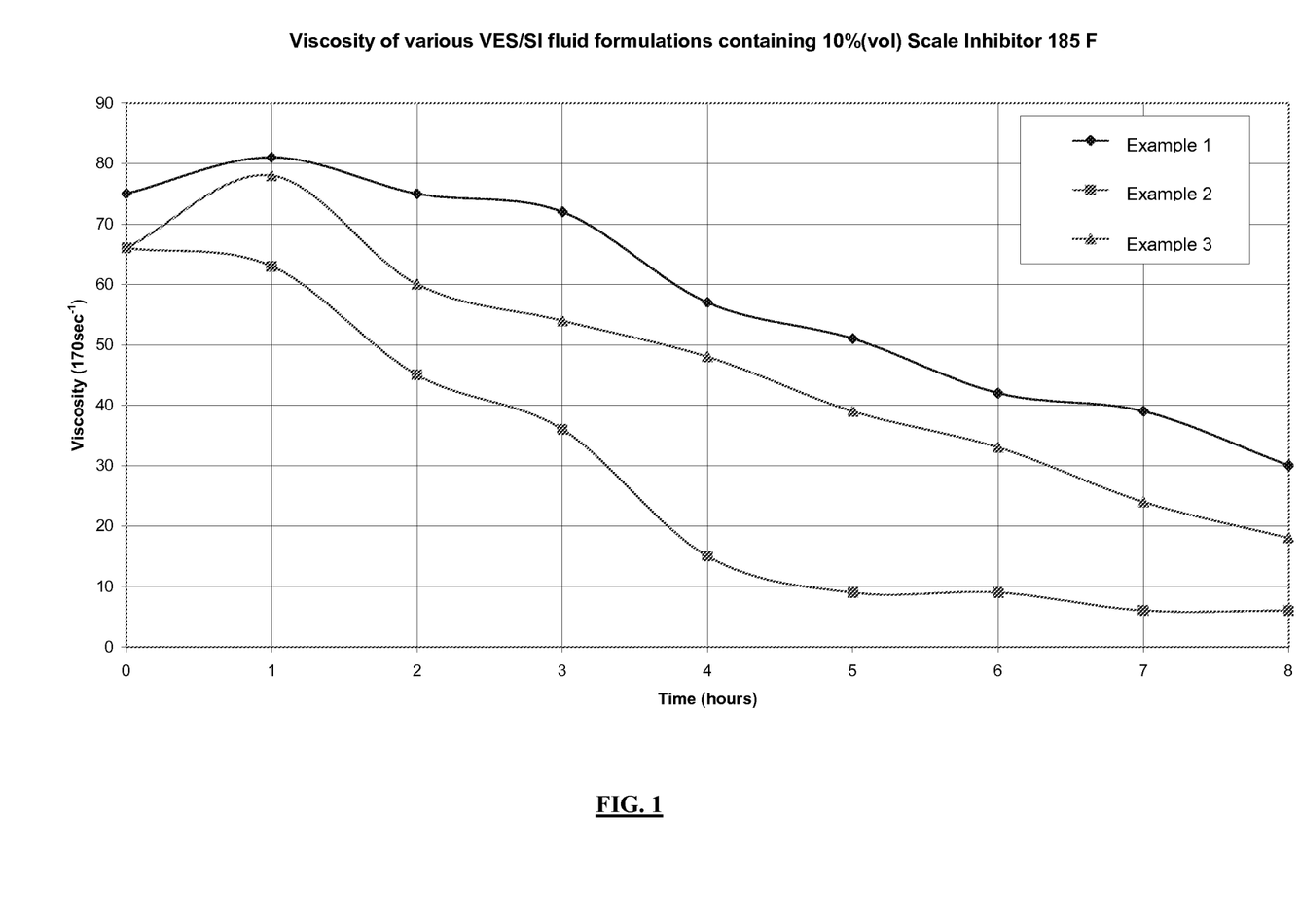
FIG. 1 shows the viscosity over time of Examples 1 through 3 at 185° F. and illustrates that the scale inhibitors, when compared to a formulation without scale inhibitor, gradually reduce in viscosity.

An interesting and novel outcome of this invention is that the micelles disband when in prolonged contact with the scale inhibitor molecules at bottom hole temperature reducing the viscosity of the fluid (see FIG. 1). Hence, the viscoelastic surfactant is removed from the reservoir zones during oil or gas production leaving the scale inhibitor portion of the fluid adsorbed onto the formation minerals and ready to prevent scale deposits occurring.

In cases where there is a water-bearing zone that is substantially, but not completely, free of hydrocarbon residues, it may be advantageous to pump a sequence of fluids. The initial fluid would include a solvent capable of dissolving both water and crude oil, i.e., a mutual solvent. Such solvents include esters such as butyl acetate, ethyl acetate and the like; ethers such as tetrahydrofuran and low molecular weight glycol ethers, e.g., EGMBE; low molecular weight alcohols such as methanol, ethanol, propanol, isopropyl alcohol, and the like; and similar materials. This could optionally be followed by a brine spacer fluid. The next fluid would be the viscoelastic surfactant an scale inhibitor formulation, which is followed finally by the non-viscosified scale inhibitor. These stages could be repeated as necessary during the treatment.

In some embodiments of the invention, the structure for surfactants used may be written generically as:

wherein $R_1$ can be any hydrophobic chain of greater than about 10 carbon atoms—what is important is that its hydrophobicity is roughly the same as the embodiments shown below; whether it includes some hydrophilic functionalities is less important than overall chain length and overall hydrophobicity. Importantly, $R_1$ may have a variety of different functional groups. The groups denoted as $R_2$ and $R_4$ may be the same or different and are small (about 1-6 carbons) hydrocarbon groups—branched or straight chain, saturated or unsaturated. They can also be hydroxyalkyl groups (e.g., $CH_2OH$ or $CH_2CH_2OH$). The group denoted as $R_3$ is, in the preferred embodiments, $-(CH_2)_nCOO^-$ in which n is about 1-6. In other embodiments, the carboxylate group can be replaced by phosphate, phosphonate, sulfonate, or sulfate, for instance—what is crucial for this particular portion of the molecule is not the precise chemical structure, but its acid-base behavior. Accordingly, systems having similar acid-base behavior as the preferred embodiments, certainly lie within the scope of the present invention.

For some surfactants used in accordance with the invention, the hydrophobic tails of the surfactants promote aggregation or self-partitioning, which in turn leads to gel formation. These groups should be sufficiently hydrophobic to enable gel formation to occur, but not so hydrophobic that the molecules cannot be disaggregated during pumping and initial migration into the formation. While the precise mechanisms for the gelling and ungelling are not known, electrostatic repulsion is believed to play a role. Between the quaternary amine and the carboxylate group is preferably a relatively small alkyl chain (e.g., p=1-6). In addition, other co-surfactants such as aromatic sulfonates may be included in the fluids.

In some embodiments of the invention, a viscoelastic surfactant (VES) may be used as the surfactant. The VES may be selected from the group consisting of cationic, anionic, zwitterionic, amphoteric, nonionic and combinations thereof. Some nonlimiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

Nonlimiting examples of suitable viscoelastic surfactants useful for viscosifying some fluids include cationic surfactants, anionic surfactants, zwitterionic surfactants, amphoteric surfactants, nonionic surfactants, and combinations thereof.

In general, particularly suitable zwitterionic surfactants have the formula:

RCONH—$(CH_2)_a(CH_2CH_2O)_m(CH_2)_b$—$N^+(CH_3)_2$—$(CH_2)_{a'}(CH_2CH_2O)_{m'}(CH_2)_{b'}COO^-$ in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m +m') is from 0 to 14; and $CH_2CH_2O$ may also be $OCH_2CH_2$.

Preferred zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. VES systems, in particular BET-E-40, optionally contain about 1% of a condensation product of a naphthalene sulfonic acid, for example sodium polynaphthalene sulfonate, as a rheology modifier, as described in U.S. Patent Application Publication No. 2003-0134751. The surfactant in BET-E-40 is also shown below; one chemical name is erucylamidopropyl betaine. BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The rheology enhancers of the present invention may be used with viscoelastic surfactant fluid systems that contain such additives as co-surfactants, organic acids, organic acid salts, and/or inorganic salts.

Surfactant in BET-O-30 (when n = 3 and p = 1)

Surfactant in BET-E-40 (when n = 3 and p = 1)

SDBS (when x = 11 and the counterion is $Na^+$)

Some embodiments of the present invention use betaines; most preferred embodiments use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 10%, preferably from about 1 to about 5%, and most preferably from about 1.5 to about 4.5%.

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference. Examples of suitable cationic viscoelastic surfactants include cationic surfactants having the structure:

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members. They may also contain performance enhancers, such as viscosity enhancers, for example polysulfonates, for example polysulfonic acids, as described in copending U.S. Patent Application Publication No. 2003-0134751 which has a common Assignee as the present application and which is hereby incorporated by reference.

Another suitable cationic VES is erucyl bis(2-hydroxyethyl)methyl ammonium chloride, also known as (Z)-13 docosenyl-N-N-bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl)ammonium chloride; erucylamidopropyltrimethylamine chloride, octadecyl methyl bis(hydroxyethyl)ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl)ammonium salicylate; cetyl methyl bis(hydroxyethyl)ammonium 3,4,-dichlorobenzoate; cetyl tris(hydroxyethyl)ammonium iodide; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris(hydroxyethyl) ammonium bromide; hexadecyl ethyl bis(hydroxyethyl)ammonium chloride; hexadecyl isopropyl bis(hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl) methyl ammonium chloride, inherently have short re-heal times and the rheology enhancers of the present invention may not be needed except under special circumstances, for example at very low temperature.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Patent Application Nos. 2002/0147114, 2005/0067165, and 2005/0137095, for example amidoamine oxides. These four references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$R_1CON(R_2)CH_2X$ wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

Any suitable amount of surfactant can be used in accordance with the invention. In some embodiments, the amount of surfactant can range from about 0.1% to about 15% by weight of total weight of fluid, preferably from about 0.5% to about 15% by weight of total weight of fluid, more preferably from about 2% to about 10% by weight of total weight of fluid. The lower limit of surfactant should no less than about 0.1, 0.2, 0.5, 0.7, 0.9, 1, 2, 3, 4, 5, 6, 7, 8, 9, 10, or 14 percent of total weight of fluid, and the upper limited being no more than about 15 percent of total fluid weight, specifically no greater than about 15, 14, 13, 12, 11, 10, 9, 8, 7, 6, 5, 1, 0.9, 0.7, 0.5 or 0.3 percent of total weight of fluid. The fluids may have any suitable viscosity, preferably a viscosity value of less than about 100 mPa-s at a shear rate of about 100 s$^{-1}$ at treatment temperature, more preferably less than about 75 mPa-s at a shear rate of about 100 s$^{-1}$, and even more preferably less than about 50 mPa-s.

Fluids useful in the invention may also include a viscosifier that may be a polymer that is either crosslinked or linear, a viscoelastic surfactant, or any combination thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers are used typically for high-temperature applications. Nonlimiting examples of suitable viscoelastic surfactants useful for viscosifying some fluids include cationic surfactants, anionic surfactants, zwitterionic surfactants, amphoteric surfactants, nonionic surfactants, and combinations thereof. Also, associative polymers for which viscosity properties are enhanced by suitable surfactants and hydrophobically modified polymers can be used, such as cases where a a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in published application U.S. 20040209780A1, Harris et. al.

In some method embodiments, the viscosifier is a water-dispersible, linear, nonionic, hydroxyalkyl galactomannan polymer or a substituted hydroxyalkyl galactomannan polymer. Examples of useful hydroxyalkyl galactomannan polymers include, but are not limited to, hydroxy-C1-C4-alkyl galactomannans, such as hydroxy-C1-C4-alkyl guars. Preferred examples of such hydroxyalkyl guars include hydroxyethyl guar (HE guar), hydroxypropyl guar (HP guar), and hydroxybutyl guar (HB guar), and mixed C2-C4, C2/C3, C3/C4, or C2/C4 hydroxyalkyl guars. Hydroxymethyl groups can also be present in any of these.

As used herein, substituted hydroxyalkyl galactomannan polymers are obtainable as substituted derivatives of the hydroxy-C1-C4-alkyl galactomannans, which include: 1) hydrophobically-modified hydroxyalkyl galactomannans, e.g., C1-C18-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be C1-C4 oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-C1-C4-alkyl guars, such descriptions apply equally to other galactomannans, as well.

When incorporated, the polymer based viscosifier may be present at any suitable concentration. In various embodiments hereof, the gelling agent can be present in an amount of from about 10 to less than about 60 pounds per thousand gallons of liquid phase, or from about 15 to less than about 40 pounds per thousand gallons, from about 15 to about 35 pounds per thousand gallons, 15 to about 25 pounds per thousand gallons, or even from about 17 to about 22 pounds per thousand gallons. Generally, the gelling agent can be present in an amount of from about 10 to less than about 50 pounds per thousand gallons of liquid phase, with a lower limit of polymer being no less than about 10, 11, 12, 13, 14, 15, 16, 17, 18, or 19 pounds per thousand gallons of the liquid phase, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Hydroxypropyl guar, carboxymethyl hydroxypropyl guar, carboxymethyl guar, cationic functional guar, guar or mixtures thereof, are preferred polymers for use herein as a gelling agent.

Incorporating crosslinkers into the fluid may further augment the viscosity of the fluid. Crosslinking consists of the attachment of two polymeric chains through the chemical association of such chains to a common element or chemical group, whereas such element or group is referred to as the crosslinker. Typical crosslinkers are polyvalent metal ions, more often zirconium or titanium ions, or borate ions. Crosslinking is very sensitive to the prevailing pH. For example, crosslinking with borate ions can be performed only in alkaline media (pH>8). pH-regulating systems ("buffers") are often required to achieve effective crosslinking with metal ions.

Any suitable scale inhibitor may be used according to the invention, as long as they are effective in upon being placed in the reservoir zone of interest, and adsorbed onto the formation minerals to help prevent scale deposits from occurring during oil or gas production. Examples of some suitable scale inhibitors include, but are not necessarily limited to compounds selected from the classes of phosphate esters, phosphonates, phosphonate polymers, polycarboxylates, phosphorous containing polycarboxylates, or any combination thereof. Scale inhibitors may contain several reactive groups (carboxylate and/or phosphonate) which are capable of interacting with polyvalent metal ions to prevent scale deposits. Some examples of inhibitors include a polycarboxylate, (homo or copolymer of an ethylenically unsaturated acid monomer such as acrylic acid, methacrylic acid, maleic acid, itaconic acid, fumaric acid, mesoconic acid, citraconic acid and the like), monoesters of diacids with alkanols, e.g., having 1-8 carbon atoms, and mixtures thereof. Monomeric and polymeric phosphonates, e.g., aminomethylenephosphonates and homopolymers and copolymers of vinylphosphonate. Another class of inhibitors which may be used in practicing the method of this invention are organic phosphate esters such as phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine. Other suitable scale inhibitors include those supplied by M-I Production Chemicals Ltd, such as, by non-limiting example, phosphorus end capped polycarboxylic acid, sulphonated polycarboxylic acid copoloymer, DETA phosphonate, penta-phosphonate, and the like.

Any applicable amount of scale inhibitors may be used, for example, up to about 20% by weight based upon total fluid weight, preferably from about 1% by weight to about 15% by weight based upon total fluid weight, and more preferably from about 5% by weight to about 12% by weight based upon total fluid weight. The lower limit of surfactant should no less than about 0.1, 0.2, 0.4, 0.6, 0.8, 1, 2, 3, 4, 5, 6, 7, 8, 9, 10, 11, 12, 13 or 14 percent oftotal weight of fluid, and the upper limited being no more than about 15 percent of total fluid weight, specifically no greater than about 20, 15, 14, 13, 12, 11, 10, 9, 8, 7, 6, 5, 1, 0.9, 0.7, 0.5 or 0.3 percent of total weight of fluid. The polymeric and phosphorous type scale inhibitors described above are optimally used in brines having pH values between 5.0-8.5. On either side of this pH range, the effectiveness of these scale inhibitors decreases. However, they may be used at a variety of temperatures and pH ranges.

Aqueous medium may be water or a brine solution. In those embodiments of the invention where the aqueous medium is a brine, the brine may be seawater or other brine solutions such as KCl, $ZnCl_2$, $CaCl_2$, $ZnBr_2$, NaCl, $CaBr_2$, $NH_4Cl$, $MgCl_2$, seawater, NaBr, $Na_2S_2O_3$, NaCl, CaBr2, tetramethyl ammonium chloride, sodium acetate, sodium formate, potassium acetate, potassium formate, and the like, or any combinations thereof. Any brine used may have a density of from about 8.3 lb/gal to about 16.0 lb/gal or any density along the continuum between about 8.3 lb/gal and about 16.0 lb/gal. Furthermore, it will be clear to one of ordinary skill in the art that other brine solutions may be used. The salt may be selected for compatibility reasons i.e. where the reservoir drilling fluid used a particular brine phase and the completion/clean up fluid brine phase is chosen to have the same brine phase. In addition, some embodiments of the invention may include no such salts.

Fluids used in some methods of the invention may include a gas component which may be produced from a suitable gas that forms an energized fluid or foam when introduced into the aqueous medium. See, for example, U.S. Pat. No. 3,937,283 (Blauer et al.) hereinafter incorporated by reference. Preferably, the gas component comprises a gas selected from the group consisting of nitrogen, air, carbon dioxide and any mixtures thereof. More preferably the gas component comprises carbon dioxide, in any quality readily available. The gas component assists in the fracturing operation and the well clean-up process. The fluid may contain from about 10% to about 90% volume gas component based upon total fluid volume percent, preferably from about 30% to about 80% volume gas component based upon total fluid volume percent, and more preferably from about 40% to about 70% volume gas component based upon total fluid volume percent. When a gas component is incorporated, any surfactant for which its ability to aid the dispersion and/or stabilization of the gas component into the base fluid to form an energized fluid or foam is readily apparent to those skilled in the art may also be used.

Fluids useful in some embodiments of the invention may further contain other additives and chemicals that are known to be commonly used in oilfield applications by those skilled in the art. These include, but are not necessarily limited to, materials such as surfactants in addition to those mentioned hereinabove, oxygen scavengers, alcohols, corrosion inhibitors, fluid-loss additives, bactericides, and the like.

In one embodiment of the invention, the first step in a scale inhibitor squeeze would be to inject a mixture of viscoelastic surfactant and scale inhibitor into a water producing zone and allow migration of subsequent non-viscosified scale inhibitor into oil or gas zones that contain a reduced concentration of water compared to the water-producing zone. For example, a fluid composed of a combination of viscoelastic surfactant and scale inhibitor (VES/SI) with viscosity between about 5 and about 500 mPa-s at 100 $sec^{-1}$ at bottom hole temperature could be pumped into the formation. Since the fluid is water-based the mobility of the VES/SI into the water-bearing zone is greater than the mobility of the VES/SI into the oil or gas zone. As a result, a plug of viscous fluid is placed selectively in the pore structure of water-bearing zones at the formation face while in contact with formation water, but not in the pore structure of the hydrocarbon zones at the formation face. When scale inhibitor is subsequently introduced into the formation, the scale inhibitor will go preferentially into the hydrocarbon zone or those zones containing less concentration of water because the high viscosity plug selectively blocks movement into the water-bearing zone.

In another embodiment of the invention a VES/SI fluid would be to injected into a reservoir with permeability contrast between zones. The zone of highest permeability will accept the VES/SI until pressure rise diverts a non-viscosified scale inhibitor fluid into a zone of lower permeability. The process can then be repeated until substantial coverage of the wellbore is achieved.

In yet another embodiment of the invention a low viscosity VES/SI fluid is injected by bullheading into the reservoir. For example, a VES/SI with viscosity between about 1 and about 500 mPa-s at 100 $sec^{-1}$ at bottom hole temperature could be pumped into the wellbore. As described above the fluid would be attracted to the zone with the highest concentration of water and/or zone of highest permeability until sufficient pressure rise was achieved to divert the VES/SI into the zone with the next highest permeability or water concentration. The process would be repeated until all zones in the well bore were treated. Applying a lower viscosity VES/SI fluid would lead to a greater depth of invasion into the reservoir, enabling placement of the scale inhibitor at the 1 to 5 meters required to prevent scale deposits forming and lowering oil production.

The following examples are presented to illustrate some scale inhibition squeeze treatment method embodiments of the invention, and should not be construed to limit the scope of the invention, unless otherwise expressly indicated in the appended claims. All percentages, concentrations, ratios, parts, etc. are by weight unless otherwise noted or apparent from the context of their use.

EXAMPLES

The following examples illustrate the compositions and methods of the present invention, as described hereinabove.

The fluids used in the examples were formed by mixing 10% by weight based on total fluid weight of particular scale inhibitors into a seawater solution containing 3% by weight of erucylamidopropyl betaine surfactant. In these examples, the scale inhibitors obtained from M-I Production Chemicals Ltd, UK:

Example 1: Phosphorus end capped polycarboxylic acid
Example 2: Sulphonated polycarboxylic acid copoloymer
Example 3: Standard DETA phosphonate
Example 4: Standard penta-phosphonate
Example 5: Sample containing no scale inhibitor.

FIG. 1 illustrates the viscosity trend over time of Examples 1 through 3 at 185° F. and illustrates that the fluids including scale inhibitors gradually reduce in viscosity,. Viscosity was measured on a Chan35 Co-Axial Viscometer using a Rotor 1; Bob 1; Spring 1 combination to achieve a shear rate of 170 $sec^{-1}$.

Figure 2:
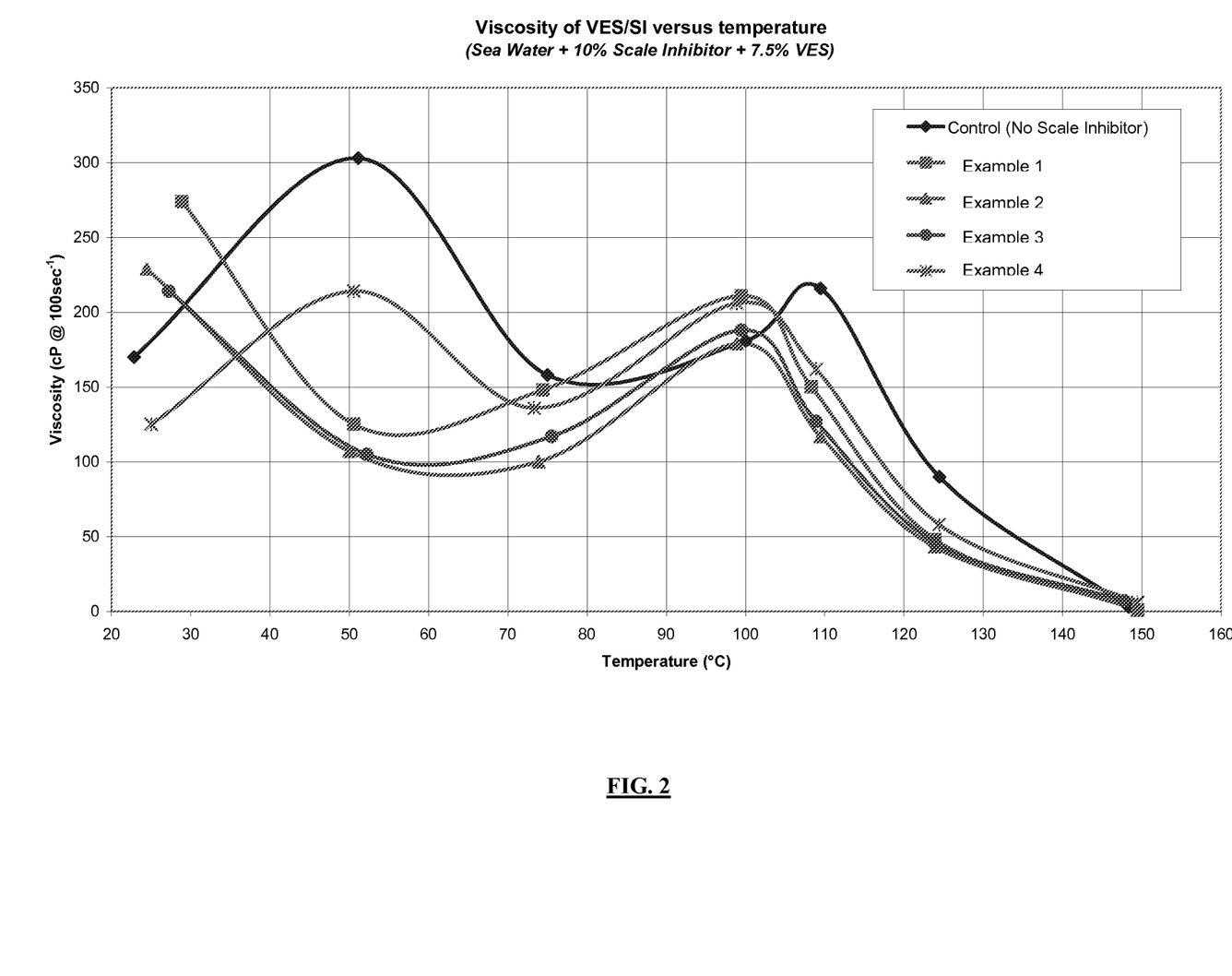
FIG. 2 illustrates the temperature stability of the four fluids formulated in accordance with the present invention compared to a fluid that has no scale inhibitor included.

FIG. 2 illustrates the temperature stability of the four fluids formulated in accordance with the present invention as compared to a fluid that has no scale inhibitor included. This data clearly shows that the use of a viscoelastic surfactant mixed with scale inhibitor is effective over a wide range of temperatures. Viscosity values illustrated in FIG. 2 were obtained using a Chandler Reciprocating Viscometer at shear rate of 100 $sec^{-1}$.

Furthermore, while the above embodiments describe surfactant/scale inhibitor aqueous solutions for use as scale inhibition, the solutions and methods may be used for other applications. One of ordinary skill in the art, having reference to this disclosure would recognize these applications without having to perform undue experimentation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A scale inhibition squeeze treatment method for a hydrocarbon-containing formation, the method comprising:
   a. preparing a fluid comprising:
      i. a viscosifier;
      ii. a non-viscosifying scale inhibitor in an amount of from about 0.1% to about 20% by weight; and
      iii. a brine with a density of from about 8.3 lb/gal to about 16.0 lb/gal and a pH value from 5.0 to 8.5;
   b. injecting the fluid into a wellbore; and
   c. introducing the fluid into a formation,
   wherein the fluid is substantially free of acid for acid treatment purpose;
   wherein the fluid is introduced into a formation with permeability contrast between at least two zones;
   wherein the fluid pressure increases and the fluid penetrates a higher permeability zone and diverts the scale inhibitor, and
   wherein the scale inhibitor concentration increases in a zone of lower permeability.

2. The method of claim 1 where scale inhibition fluid properties are provided by a phosphorus containing molecule.

3. The method of claim 1 wherein the scale inhibitor is a phosphorus end capped polycarboxylic acid, the phosphorus end capped polycarboxylic acid scale inhibitor incorporated into the fluid in an amount from about 5% to about 20% by weight.

4. The method of claim 1 wherein the brine contains at least one salt selected from the group consisting of KCl, $ZnCl_2$, $CaCl_2$, $ZnBr_2$, NaCl, $CaBr_2$, $NH_4Cl$, $MgCl_2$, NaBr, $Na_2S_2O_3$, NaCl, $CaBr_2$, tetramethyl ammonium chloride, sodium acetate, sodium formate, potassium acetate, and potassium formate.

5. The method of claim 1 wherein the brine is seawater.

6. The method of claim 1 as repeated at least one more occasion within a treatment operation.

7. The method of claim 1 further comprising introducing a lower viscosity fluid into the formation to further increase the concentration of scale inhibitor in the zone of lower permeability.

8. The method of claim 1 wherein the fluid is introduced into a water producing zone of a formation, and scale inhibitor is allowed to migrate into at least one zone containing a reduced concentration of water as compared with the water producing zone.

9. The method of claim 1 wherein the viscosifier is a surfactant selected from a family of compounds described by:

where $R_3$ contains at least 10 carbon atoms, p=1-6, $R_2$ contains 1-6 carbon atoms and $R_1$ contains 1-6 carbon atoms.

10. The method of claim 9 wherein the viscosifier is oleylamidopropyl betaine or erucylamidopropyl betaine.

11. The method of claim 1 wherein the scale inhibitor is selected from the group consisting of phosphate esters, phosphonates, phosphonate polymers, polycarboxylates, phosphorous containing polycarboxylates, phosphate esters of polyols, hydroxylamine phosphate esters, or any combination thereof.

12. The method of claim 1 wherein the viscosifier is a polymer.

13. The method of claim 12 wherein the polymer is guar, hydropropyl guar (HPG), carboxymethyl guar (CMG), carboxymethylhydroxypropyl guar (CMHPG), cellulose, hydroxyethylcellulose (HEC), hydroxypropylcellulose (HPC), carboxymethylhydroxyethylcellulose (CMHEC), xanthan, diutan, scleroglucan, polyacrylamide, polyacrylate, or any mixture thereof.

14. The method of claim 12 wherein the fluid further comprises a crosslinker.

15. The method of claim 1 wherein the fluid further comprises a gas component.

16. A method of treating a hydrocarbon-containing formation, the method comprising:
   a. preparing a fluid comprising:
      i. a surfactant selected from a family of compounds described by:

where $R_3$ contains at least 10 carbon atoms, p=1-6, $R_2$ contains 1-6 carbon atoms and $R_1$ contains 1-6 carbon atoms;
      ii. a phosphorus end capped polycarboxylic acid in an amount of from about 0.1% to about 20% by weight; and
      iii. a brine with a density of from about 8.3 lb/gal to about 16.0 lb/gal and a pH value from 5.0 to 8.5;
   b. injecting the fluid into a wellbore; and
   c. introducing the fluid into a formation,
   wherein the fluid is substantially free of acid for acid treatment purpose;
   wherein the fluid is introduced into a formation with permeability contrast between at least two zones;
   wherein the fluid pressure increases and the fluid penetrates a higher permeability zone and diverts the scale inhibitor, and
   wherein the scale inhibitor concentration increases in a zone of lower permeability.

17. The method of claim 16 wherein the surfactant is oleylamidopropyl betaine or erucylamidopropyl betaine.

18. The method of claim 16 wherein the surfactant is incorporated into the fluid in an amount from about 0.1% to about 15% by weight of total weight of fluid.

19. A method of providing a scale inhibition treatment, the method comprising: preparing a fluid comprising a viscoelastic surfactant, a phosphorous end capped polycarboxylic acid in an amount of from about 0.1% to about 20% by weight, and a brine with a density of from about 8.3 lb/gal to about 16.0 lb/gal and a pH value from 5.0 to 8.5, wherein the fluid is substantially free of acid for acid treatment purpose; and causing the fluid to make contact with an object targeted for scale inhibition treatment.

* * * * *